United States Patent [19]

Le Deit et al.

[11] Patent Number: 5,697,475
[45] Date of Patent: Dec. 16, 1997

[54] DISK BRAKE EQUIPPED WITH A MECHANICAL ACTUATING DEVICE

[75] Inventors: Gerard Le Deit, Courtry; Claude Hulliger, Thiers Sur Theve; Fernando Sacristan, Drancy, all of France; Juan Simon Bacardit; Esteve Cortes Guasch, both of Barcelone, Spain

[73] Assignee: Bosch Systemes de Freinage, Drancy, France

[21] Appl. No.: 581,557

[22] PCT Filed: Dec. 13, 1995

[86] PCT No.: PCT/FR95/01665

§ 371 Date: Jan. 16, 1996

§ 102(e) Date: Jan. 16, 1996

[87] PCT Pub. No.: WO96/23985

PCT Pub. Date: Aug. 8, 1996

[30] Foreign Application Priority Data

Jan. 31, 1995 [FR] France ................... 95 01051

[51] Int. Cl.⁶ .................. F16D 55/08; F16D 65/14
[52] U.S. Cl. .......... 188/72.9; 188/79.55; 188/205 R; 74/502.4; 74/526; 403/13
[58] Field of Search .................. 188/71.7, 71.8, 188/71.9, 72.7, 72.8, 72.9, 79.55, 79.58, 106 F, 196 M, 196 V, 205 R, 206 R, 209; 74/502.4, 502.6, 522, 526; 403/13, 84, 104, 108

[56] References Cited

U.S. PATENT DOCUMENTS

| | | | |
|---|---|---|---|
| 4,583,622 | 4/1986 | Ebbinghaus et al. | 188/79.55 |
| 4,616,518 | 10/1986 | Husser | 74/522 |
| 4,619,347 | 10/1986 | Schreiner et al. | 188/71.9 |
| 5,009,292 | 4/1991 | Hoffman, Jr. et al. | 188/79.55 |
| 5,105,682 | 4/1992 | Jung | 74/502.4 |
| 5,586,623 | 12/1996 | Mevy | 188/72.9 |

FOREIGN PATENT DOCUMENTS

| | | |
|---|---|---|
| 8811920 | 3/1990 | Germany . |
| 0579178 | 1/1994 | Germany . |
| 1169484 | 11/1969 | United Kingdom ........ 188/79.55 |

*Primary Examiner*—Robert J. Oberleitner
*Assistant Examiner*—Chris Schwartz
*Attorney, Agent, or Firm*—Leo M. McCormick, Jr.

[57] ABSTRACT

A disk brake having at least one piston (14) which slides in a caliper (12), the caliper (12) sliding over a stationary support. The piston (14) being actuateable by a mechanical subassembly (22) having substantially first (24) and second (26) parallel plates. The first plate (24) being driven in rotation by a lever (32) about an axis (X—X') perpendicular to its surface. The second plate (26) being held in a stationary position with respect to rotation and secured to piston (14). A face on at least one of the first (24) and second (26) plates has a groove formed therein for receiving balls (28) to convert rotational movement of the first plate (24) into axial translational movement of the second plate (26). The lever (32) has a first part (34) fastened onto an end (36) of a sheath of an actuating cable (38). The sheath (40) bearing on an end stop member (42) which is held stationary with respect to the caliper (12). The sheath (40) has an end stop member (42) which is formed on a brace member (44). The stop member (42) angular position about the axis (X—X') with respect to the lever (32) is determined by the angular position of the lever (32) with respect to the caliper (12).

7 Claims, 3 Drawing Sheets

DISK BRAKE EQUIPPED WITH A MECHANICAL ACTUATING DEVICE

BACKGROUND OF THE INVENTION

The present invention relates to the field of disk brakes in general, of the type of those used to provide braking on motor vehicles.

Such disk brakes in the known fashion include at least one piston sliding in a caliper itself sliding over a stationary support. The piston may be actuated hydraulically for service brake operation, and mechanically for emergency brake or parking brake operation.

Mechanical actuation may, for example, be provided by a mechanical subassembly comprising two substantially parallel plates, a first plate being able to be driven in rotation by an operating lever about an axis perpendicular to its surface, a second plate being stationary in terms of rotation and secured to the piston, the face of at least one of the plates being formed with inclined grooves taking balls for converting the rotational movement of the first plate into an axial translational movement of the second plate, the operating lever being formed with a part for fastening onto the end of a sheathed actuating cable, the sheath of the cable bearing on a sheath end stop which is stationary with respect to the caliper.

Disk brakes equipped with such mechanical actuators are well known in the art, for example from document FR-A-2,638,214. They do, however, have some drawbacks. In fact, series production requires the provision of manufacturing tolerances for the various elements making up the disk brake and the plate-type mechanical actuator.

As a result, during final assembly of the disk brake, the mechanical actuating lever is, at rest, in an angular position which can vary from brake to brake, with respect to the stationary sheath limit stop, across a not insignificant range of values. For example, variations of plus or minus 10 degrees have been observed.

It therefore follows that when the disk brake is installed on the vehicle, the maximum angular excursion of the lever between its position of rest and its extreme position closest to the stationary limit stop itself varies from brake to brake and that in some extreme cases this maximum angular excursion is insufficient for satisfactory mechanical actuation of the disk brake.

SUMMARY OF THE INVENTION

The object of the present invention is therefore to provide a disk brake with a plate-type mechanical actuation device of the type recalled hereinabove, in which the distance between the sheath limit stop, which is stationary with respect to the caliper, and the part for fastening onto the end of the sheathed actuating cable is constant from brake to brake in series production, and regardless of the initial position of the lever, bearing in mind the manufacturing tolerances, by providing means which are simple to employ and inexpensive so as to be compatible with such series production.

To this end, according to the invention, the sheath limit stop is formed on a bracing piece of which the angular position with respect to the lever is determined by the angular position at rest of the lever with respect to the caliper.

As a result, the travel of the actuating cable, and consequently the angular excursion of the operating lever, can be constant from brake to brake and set to the optimum value for the disk brake thus equipped.

According to an advantageous embodiment, the bracing piece includes an arm formed with a tab extending perpendicularly to the arm and forming a first limit stop against which the lever comes to bear in a first position.

For preference, the bracing piece is formed with an oblong slot extending substantially along an arc of a circle centered on the axis of rotation of the lever, and the oblong slot of the bracing piece has passing through it the shank of a screw secured to the caliper, so that the bracing piece can be immobilized in terms of rotation by a nut screwed onto the screw shank.

Other objects, features and advantages of the present invention will emerge more clearly from the description which follows of one embodiment given by way of non-limiting explanation, with reference to the appended drawings.

DETAILED DESCRIPTION OF THE DRAWINGS

Figure 1:
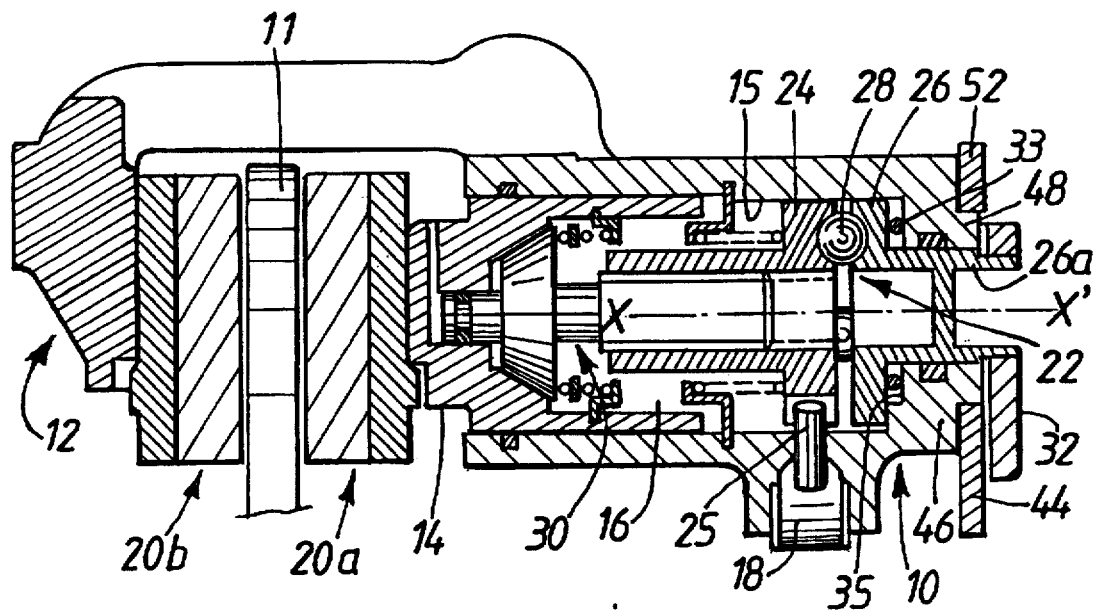
FIG. 1 is a section through a disk brake equipped with a mechanical actuating device.

Recognizable from FIG. 1 is a disk brake comprising a body 10 acting as a housing for the system for actuating the disk brake, the body 10 being secured to a caliper 12 slidably mounted on a stationary part (not represented) of the vehicle, such as the stub axle holder, in order to brake a rotating disk 11 secured to a wheel (not represented) of the vehicle.

Actuation of the disk brake may be hydraulic, via a piston 14 mounted so that it can slide in a leaktight fashion in a bore 15 of axis X—X' made in the body 10, the movement of this piston being brought about by the hydraulic pressure in a chamber 16 situated behind the piston 14, and connected by a pipe 18 to a pressure source such as a master cylinder (not represented).

The piston 14 thus presses a friction lining 20a against one face of the rotating disk 11, whilst by reaction the caliper 12 presses another friction lining 20b against the other face of the rotating disk 11.

Actuation of the disk brake may equally well be mechanical, using a plate-type actuator denoted overall by the reference 22. The actuator 22 includes two plates, an inner plate 24 and an outer plate 26, between which balls 28 are located.

The plate 24 is immobilized in terms of rotation, for example by a peg 25 secured to the body 10, for example inserted via the pipe 18. It is free in terms of translation inside the body 10 and it is secured to the piston 14 via a device denoted overall by the reference 30 and intended automatically to take up any play resulting from the progressive wear of the friction linings 20a and 20b.

The plate 26 is free in terms of rotation about the axis X—X', and it includes a pivot 26a projecting out of the body 10 and secured to an actuating lever 32 extending outside of the body 10. The plate 26 bears, via a ball bearing or roller bearing device 33, against a surface 35 perpendicular to the axis X—X'.

At least one of the opposing faces of the plates 24 and 26 is formed with curved grooves about the axis X—X', and the bottom of which is inclined with respect to a plane perpendicular to the axis X—X', so that the rotation of the plate 26, brought about by the lever 32, is converted into a translation of the plate 24, and correspondingly into a movement of the piston 14 toward the disk 11.

The lever 32 is actuated in the conventional way by a sheathed cable. As can clearly be seen in FIGS. 2 to 5, the end of the lever 32 is bent into the shape of a U in order to form a groove 34 for the fastening of a ferrule 36 crimped onto the end of an operating cable 38.

The cable 38 constitutes the core of a sheathed cable, the sheath 40 of this cable coming into abutment on a sheath limit stop 42 formed on a bracing piece 44. In the example represented, the bracing piece 44 is fitted in between the lever 32 and the rear part 46 (FIG. 1) of the caliper 12. This part 46 of the caliper is formed with a cylindrical boss 48, centered on the axis X—X', about which boss the bracing piece 44 can slide, pivoting about the axis X—X' by virtue of a circular cutout 50 of corresponding diameter.

Figure 2:
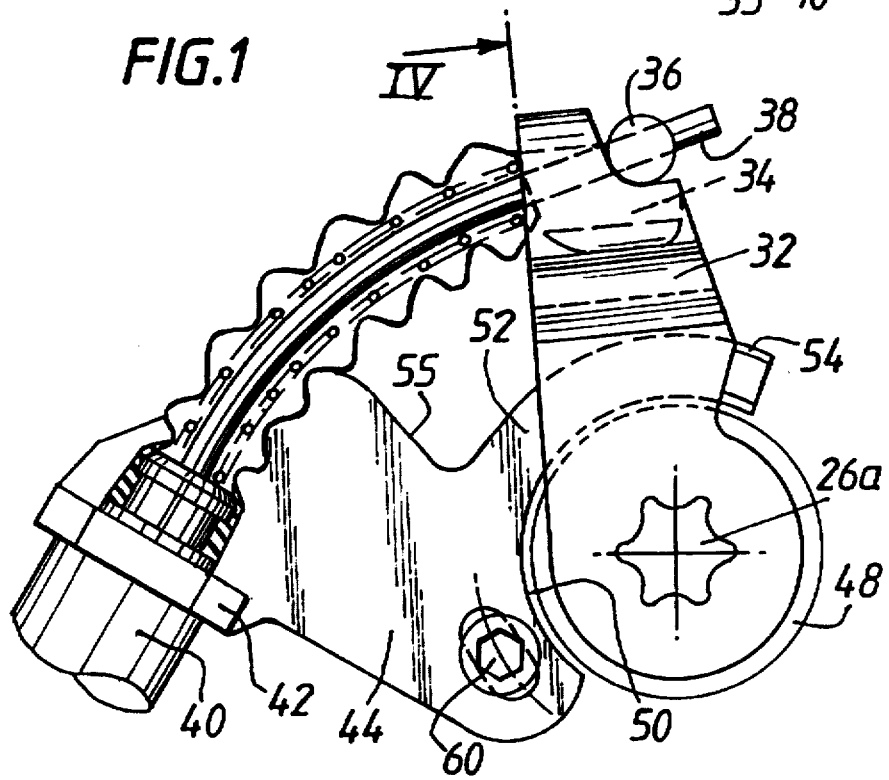
FIG. 2 is an end-on view of the mechanical actuating device according to the present invention, in the position of rest.
Figure 4:
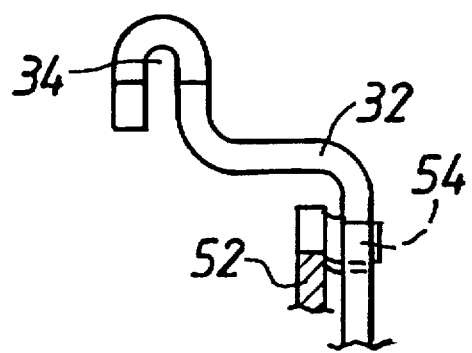
FIG. 4 is a view on IV of FIG. 2.

The bracing piece 44 includes an arm 52 extending, for example, around the circular cutout 50, and at the end of which is formed a tab 54 extending in a direction substantially perpendicular to that of the arm 52 and forming a first limit stop for the lever 32 when the latter is in the position of rest represented in FIGS. 2 and 4.

Figure 3:
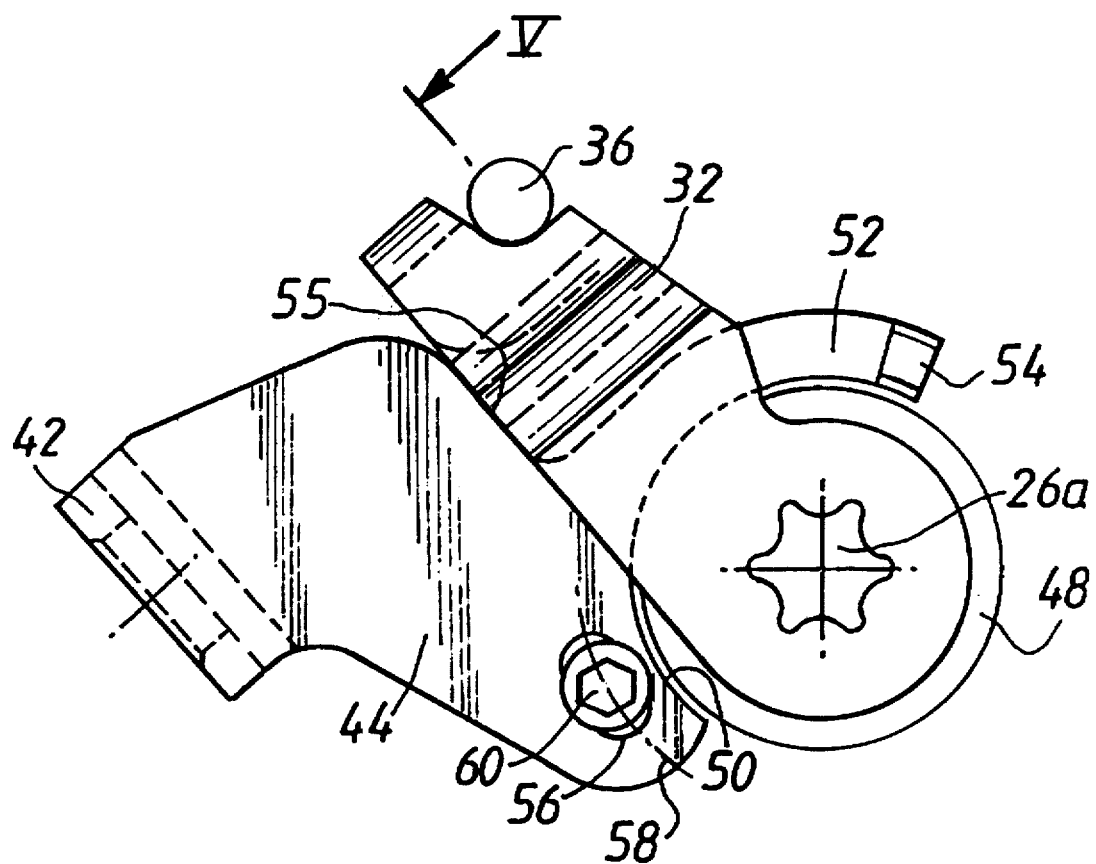
FIG. 3 is a view similar to that of FIG. 2, in an extreme actuating position.
Figure 5:
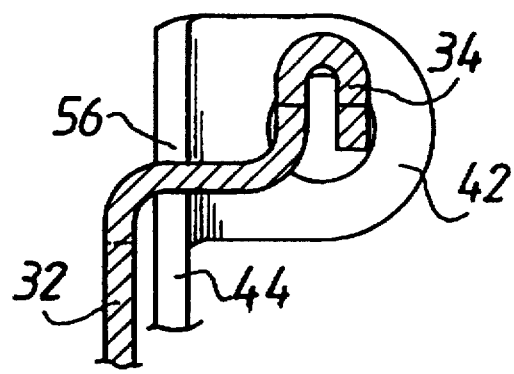
FIG. 5 is a view on V of FIG. 3.

The bracing piece 44 includes a second limit stop 55 for the lever 32 when the latter is in the extreme actuating position, represented in FIGS. 3 and 5.

Finally, the bracing piece 44 is formed with an oblong slot 56 extending substantially along an arc of a circle 58, concentric with the circular cutout 50. The circular arc 58 is therefore centered on the axis X—X' of rotation of the lever 32 when the bracing piece is in place on the caliper 12. The oblong slot 56 serves to immobilize the bracing piece 44 on the caliper 12, for example by means of a screw 60 passing through this opening and screwed into a tapped bore made in the rear part 46 of the caliper 12.

From the foregoing description, it will have been understood how the invention is put to use. Having completed the assembly of the disk brake, when all the components have been installed in the bore 15, the bracing piece 44 is put in place around the cylindrical boss 48, and the lever 32 is secured to the pivot 26a, for example by force-fitting.

Advantageously, the pivot 26a may have a non-circular shape, in the shape of a star as has been represented in FIGS. 2 and 3, or in the shape of a polygon or a splined shape, interacting with an opening of corresponding shape in the lever 32, in order to ensure that the plate 26 is driven by the lever 32 in rotation without play.

It was seen above that, after this final assembly, owing to the manufacturing tolerances, the angular position of the lever 32 with respect to the caliper 12 lies within a relatively broad range of values. All that then need be done is to rotate the bracing piece which, at this time is free to rotate, about the boss 48 in order to bring the tab 54 into abutment on the lever 32, in the position illustrated in FIGS. 2 and 4, then to immobilize the bracing piece 44 in this position on the caliper 12 by tightening the screw 60.

The disk brake is then set as soon as its manufacture is completed, and it is ready to be installed on a vehicle without further manipulation. Indeed, as the position of the bracing piece 44 has been defined by the position at rest of the lever 32, it follows that the position of the sheath limit stop 42 is then at a distance from the fastening groove 34 which depends merely on the geometry of the bracing piece 44, and that this distance is therefore identical for all the disk brakes thus manufactured.

It can therefore been seen that the angular travel of the lever 32, or the linear travel of the cable 38, between the position of rest illustrated in FIG. 2 and the extreme position illustrated in FIG. 3 in which the lever 32 is bearing on the limit stop 55, is independent of the initial position of the lever 32, and consequently of the manufacturing tolerances.

When the disk brake is installed on a vehicle in the course of assembly, after the caliper 12 has been fitted to the stub axle holder, the operating cable 38 can be connected to the disk brake. In order to do this, the sheath 40 is brought to bear on the sheath limit stop 42, and the cable 38 is slipped into the groove 34 in order to fasten the ferrule 36 therein.

With the disk brake having been set up as has just been explained, one can be sure that the ferrule 36 is at the desired distance from the sheath limit stop 42, and that it can accomplish the entire actuation travel intended for such a disk brake, between the position of rest of FIGS. 2 and 4 and the extreme actuation position of FIGS. 3 and 5, in which the lever 32 is bearing on the limit stop 55. No additional setting is therefore required on the vehicle assembly line.

The maximum angular excursion of the lever 32 is thus determined solely by the angular distance between the two limit stops 54 and 55, both formed on the bracing piece 44. Likewise, the angular distance at rest between the ferrule 36 and the end of the sheath 40 of the cable is determined solely by the geometry of the bracing piece 44 when it is bearing, via the limit stop 54, against the lever 32.

The bracing piece allowing these operations may easily be produced by pressing a metal sheet, and it therefore does not significantly increase the cost price of the disk brake thus obtained. Furthermore, it bears the limit stops 42, 54 and 55 and thus constitutes a limit stop piece which can be manufactured in a single operation. The angular distances between these various limit stops can therefore be respected with quite good accuracy.

It is thus clear that the maximum excursion of the lever 32 will be ensured in all cases, regardless of the angular position at rest of the lever 32. The setting-up of the mechanical actuating device as provided for by the invention has no influence on this maximum excursion. It has the sole effect of varying, slightly, the slack in the cable between the sheath limit stop 42 and, for example, the handbrake lever (not represented) situated in the passenger compartment of the vehicle.

It can therefore clearly be seen that the setting means provided by the invention are particularly simple to use because all that required, during manufacture of the disk brake, is to bring two components into abutment one on the other, and to tighten a screw, then to install this brake on a vehicle without further setting.

Another significant advantage afforded by the invention is that it is possible very easily to get back to this initial setting position, even after the screw 60 has been accidentally removed, for example by someone not familiar with this type of brake.

Figure 6:
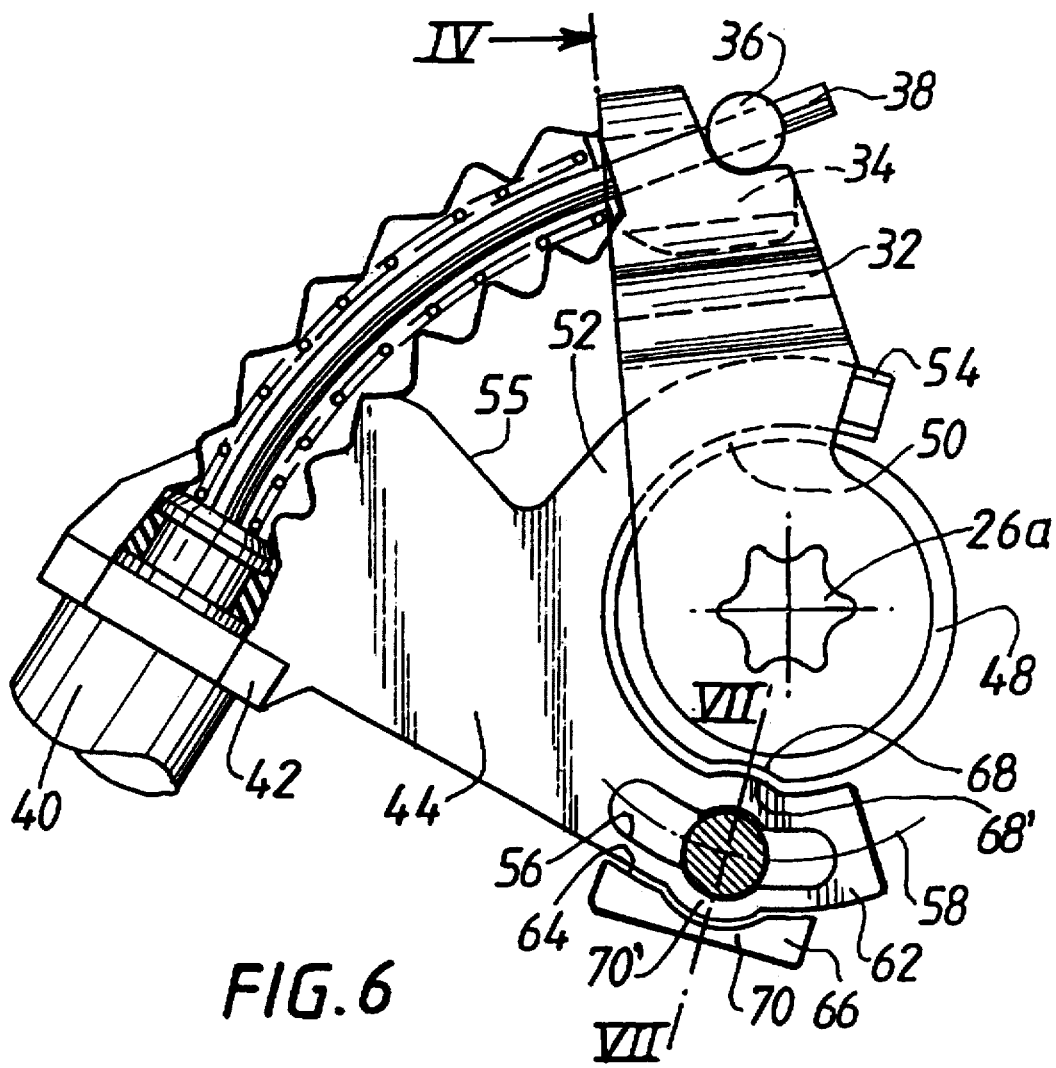
FIG. 6 is a view similar to that of FIG. 2, of an alternative embodiment.
Figure 7:
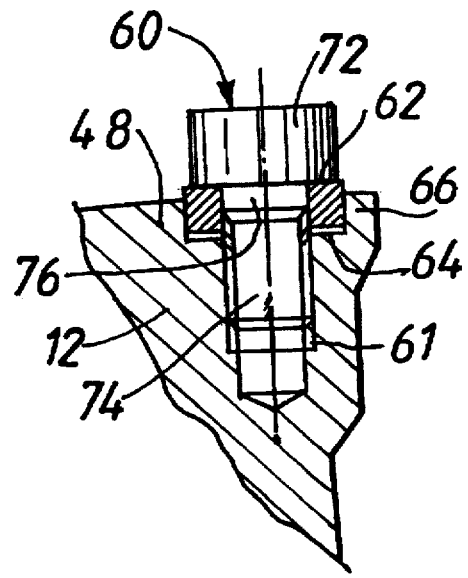
FIG. 7 is a section on VII—VII of FIG. 6.

As can be seen in FIGS. 6 and 7, the oblong slot 56 is formed in a second arm 62 of the bracing piece 44, accommodated in a curved groove 64 extending along an arc of a circle centered on the axis X—X'. The groove 64 is formed between the cylindrical boss 48 and a part 66 of the body 10 projecting axially toward the rear of the caliper 12.

The tapped bore 61 designed to interact with the screw 60 is made in the bottom of this groove, substantially in the middle of the circular arc which it forms. The groove 64 thus participates in guiding the bracing piece 44 when it is rotated about the cylindrical boss 48 in order to set it, as has been explained above.

Furthermore, a concave radial depression 68 is formed in the wall of the groove 64 formed by the cylindrical boss 48, the center of this depression 68 being situated substantially on a radius joining the axis X—X' to the axis of the tapped bore 61.

Likewise, a concave radial depression 70 is formed in the wall of the groove 64 formed by the projecting part 66 of the caliper 12, the center of this depression 70 being situated substantially on a radius joining the axis X—X' to the axis of the tapped bore 61, so that the two depressions 68 and 70 face each other on each side of the axis of the tapped hole 61.

Finally, the screw 60 includes, between its operating head 72 and its threaded shank 74, an intermediate part 76 of axial length substantially equal to the thickness of the bracing piece 44, and the cross-section of which adopts a cam shape, the largest diameter of which is greater than the initial width of the oblong slot 56.

When the brake is being set in the way which has already been explained, once the tab 54 is bearing on the lever 32, the initial effect of tightening the screw 60 in the bore 61 is to hold it radially in the caliper 12.

Then, as the screw 60 is tightened further, the intermediate part 76 is brought into the vicinity of the edge of the oblong slot 56. The cam-shaped cross-section of the intermediate part 76 then deforms the walls of the slot 56, which deformation is passed on to the material of the arm 62, the depress then expand into the depressions 68 and 70, therein forming bumps 68' and 70' respectively. The bracing piece 44 is thus in its optimum position as defined above.

In contrast, if the screw 60 is taken out following an incorrect operation, the bracing piece 44 is no longer held and can then escape. It will then be very easy to put it back in place, and what is more, to put it back in place in its initial and optimum setting position. In fact, it will have been understood that the only possible angular position for the bracing piece 44 on the caliper 12 is the one in which the bumps 68' and 70' are put back in place in the depressions 68 and 70.

All that will then be required will be to put the bracing piece 44 back into this position, then to retighten the screw 60, or even some other screw which does not have the intermediate cam-shaped part 76, in order to regain the disk brake with its optimum initial setting.

Of course, the invention is not limited to the embodiments which have been described, but can in contrast receive numerous modifications which will be obvious to the expert, without departing from the scope of the appended claims. Thus, for example, omitting the projecting part 66 of the caliper, that is to say omitting one of the radial walls of the groove 64 may be envisaged. In this case, the angular position of the bracing piece 44 corresponding to its initial setting will be identified by just one bump 68' interacting with the single depression 68 formed on the cylindrical boss 48.

We claim:

1. A disk brake including at least one piston sliding in a caliper, said caliper sliding over a stationary support, said piston being actuateable by a mechanical subassembly comprising first and second substantially parallel plates, said first plate being able to be driven in rotation by a lever about an axis perpendicular to its surface, said second plate being stationary in terms of rotation and secured to said piston, at least one of said first and second plates having a face formed with inclined grooves retaining balls for converting rotational movement of said first plate into an axial translational movement in said second plate, said lever having a part connected onto an end of a sheath for an actuating cable, said sheath of the cable bearing on a sheath end stop piece held in a stationary position with respect to said caliper, characterized in that said sheath end stop piece is formed on a bracing member, said bracing member being located in a first angular position about an axis with respect to said lever, said first angular position being determined by a second angular position of the lever with respect to the caliper, said bracing member including an arm formed with a tab extending perpendicularly to said arm and forming a first limit stop against which said lever comes to bear in a first position, said bracing member being formed with an oblong slot, the long axis of said oblong slot extending substantially in an arc of a circle centered on said axis of rotation of said lever, said bracing member being immobilized in terms of rotation with respect to said caliper by means of a screw passing through the oblong slot of the bracing member and interacting with a tapped bore made in said caliper.

2. The disk brake according to claim 1, characterized in that said bracing member is formed with a second limit stop against which said lever comes to bear in a second position.

3. The disk brake according to claim 2, characterized in that a first position of the lever corresponds to its position of rest, and in that a second position of the lever corresponds to its position of maximum excursion.

4. The disk brake according to claim 3, characterized in that at least one concave radial depression is formed in one of the radial walls of said curved groove.

5. The disk brake according to claim 1, characterized in that said oblong slot is formed in a second arm of the bracing member, said second arm being accommodated in a curved groove extending along an arc of a second circle centered on the axis of rotation of said lever, said groove being formed between a cylindrical boss and a projecting part of said caliper.

6. The disk brake according to claims 5, characterized in that said curved groove includes a concave radial depression in a wall formed by said cylindrical boss and a concave radial depression in the wall formed by said projecting part, the centers of the concave radial depressions being aligned on a radius joining the axis of rotation of said lever and the axis of said tapped bore interacting with said screw.

7. The disk brake according to claim 6, characterized in that said screw includes, an intermediate part located between an operating head and a threaded shank, said intermediate part having a cross-section of which adopts a cam shape of which the largest diameter is greater than the initial width of said oblong slot.

* * * * *